United States Patent
Sueyoshi

(10) Patent No.: US 8,761,929 B2
(45) Date of Patent: Jun. 24, 2014

(54) ROBOT SYSTEM

(75) Inventor: Satoshi Sueyoshi, Fukuoka (JP)

(73) Assignee: Kabushiki Kaisha Yaskawa Denki, Kitakyushu-Shi (JP)

(*) Notice: Subject to any disclaimer, the term of this patent is extended or adjusted under 35 U.S.C. 154(b) by 258 days.

(21) Appl. No.: 13/327,758

(22) Filed: Dec. 16, 2011

(65) Prior Publication Data

US 2013/0085601 A1   Apr. 4, 2013

(30) Foreign Application Priority Data

Oct. 3, 2011   (JP) .................................. 2011-219356

(51) Int. Cl.
   *B23Q 15/22*   (2006.01)

(52) U.S. Cl.
   USPC .......................................... 700/245; 212/328

(58) Field of Classification Search
   USPC ........... 700/245; 318/568.11–568.13, 568.16, 318/568.21; 212/328, 330, 332, 347, 350; 254/3 R, 12, 45
   See application file for complete search history.

(56) References Cited

U.S. PATENT DOCUMENTS

| | | | |
|---|---|---|---|
| 4,922,782 A | 5/1990 | Kawai | |
| 7,018,162 B2* | 3/2006 | Kondoh | 414/744.5 |
| 7,905,699 B2 | 3/2011 | Sueyoshi et al. | |
| 8,316,961 B2* | 11/2012 | Isobe et al. | 173/190 |

FOREIGN PATENT DOCUMENTS

| | | |
|---|---|---|
| DE | 102008058154 | 5/2010 |
| EP | 0441397 | 8/1991 |
| JP | 02-059281 | 2/1990 |
| JP | 2002-172583 | 6/2002 |
| JP | 2009-214262 | 9/2009 |
| JP | 2009-269126 | 11/2009 |
| JP | 4466785 B2 | 5/2010 |
| WO | WO2009/034854 | 3/2009 |

OTHER PUBLICATIONS

Japanese Office Action for corresponding JP Application No. 2011-219356, Aug. 13, 2013.
Extended European Search Report for corresponding EP Application No. 12156108.8-1712, May 16, 2013.

* cited by examiner

*Primary Examiner* — Dalena Tran
(74) *Attorney, Agent, or Firm* — Ditthavong Mori & Steiner, P.C.

(57) ABSTRACT

A robot system according to embodiments includes a robot and a control unit. The robot includes a plurality of movable units that operate in a predetermined direction and links connected to the movable units, and the control unit controls an operation of the movable units of the robot. Moreover, the robot system transfers a detachable member mounted on a predetermined movable unit by causing a movable unit other than the predetermined movable unit to operate in a state where the predetermined movable unit is stopped.

7 Claims, 12 Drawing Sheets

US 8,761,929 B2

ROBOT SYSTEM

CROSS-REFERENCE TO RELATED APPLICATION

This application is based upon and claims the benefit of priority of the prior Japanese Patent Application No. 2011-219356, filed on Oct. 3, 2011; the entire contents of which are incorporated herein by reference.

FIELD

The embodiments discussed herein are directed to a robot system.

BACKGROUND

Conventionally, there is known a robot system that instruct a robot by a controller controlling the robot to move a work into and out of a container or the like.

For example, Patent Document 1 proposes a robot that vertically moves by moving a leg unit and conveys a thin-plate like work, such as a semiconductor wafer, by an arm unit arranged in the upper portion.

Examples of documents related to the above-described conventional technology include Japanese Patent No. 4466785.

However, when performing a maintenance operation of a robot included in a conventional robot system, the operation needs to be performed by using heavy machinery such as a crane for lifting heavy goods. Therefore, there is a problem in that it takes time to prepare heavy machinery and perform an actual operation.

For example, when replacing a heavy part such as a motor included in a conventional robot, it takes a long time, for example, to carry in and carry out a crane, ensure working space, and mount and remove jigs.

SUMMARY

A robot system according to an aspect of embodiments includes a robot and a control unit. The robot includes a plurality of movable units that operate in a predetermined direction and links connected to the movable units, and the control unit controls an operation of the movable units of the robot. Moreover, the robot system transfers a detachable member mounted on a predetermined movable unit by causing a movable unit other than the predetermined movable unit to operate in a state where the predetermined movable unit is stopped.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS (First Embodiment)

Figure 1:
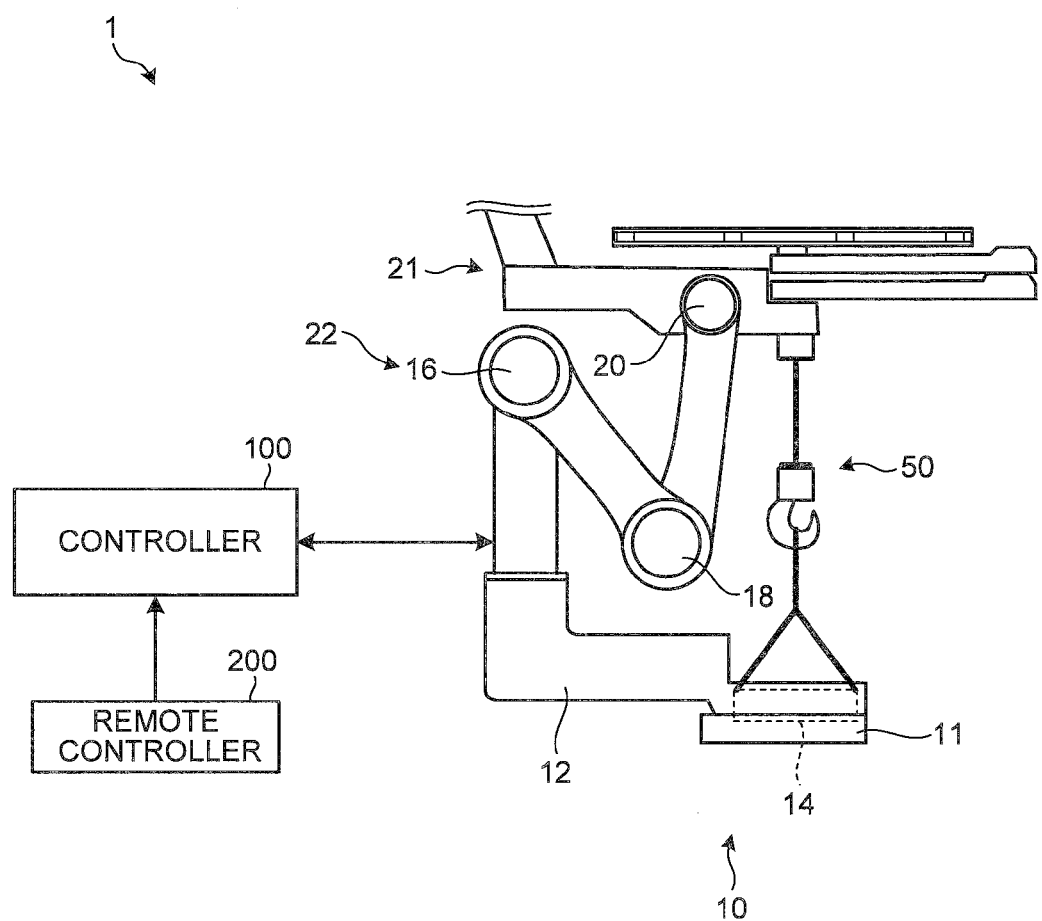
FIG. 1 is an explanatory diagram of a robot system according to a first embodiment.

First, a robot system 1 according to a first embodiment is explained with reference to FIG. 1. FIG. 1 is an explanatory diagram of the robot system 1 according to the first embodiment. In FIG. 1, the shape is partially simplified to make the explanation easy.

As shown in FIG. 1, the robot system 1 according to the first embodiment includes a robot 10, a controller 100, and a remote controller 200.

The robot 10 and the controller 100 are connected and the controller 100 and the remote controller 200 are connected. For example, the robot 10, the controller 100, and the remote controller 200 may be connected to each other by cables or may be capable of communicating with each other wirelessly.

The robot 10 is an industrial robot called manipulator. The robot 10 performs an operation, such as gripping and transfer of a work, by generating a program (hereinafter, described as "teaching") for moving the robot 10 by the remote controller 200 or the controller 100 and reproducing the taught teaching data.

The robot 10 according to the first embodiment is configured to include one leg unit. The leg unit is a part that includes a base part 12 and a lift mechanism 22 and supports a horizontal arm unit 21.

The robot 10 includes a base 11, the base part 12, a speed reducer 14, the lift mechanism 22, and the horizontal arm unit 21, and the lift mechanism 22 includes a first joint 16, a second joint 18, a third joint 20, a first link 17, and a second link 19.

The robot 10 raises and lowers the horizontal arm unit 21 in a vertical direction by driving an actuator and a motor (not shown) built in the first joint 16, the second joint 18, and the third joint 20. Details of the shape of the robot 10 and the operation of the horizontal arm unit 21 are described later with reference to FIG. 2.

The controller 100 is a control apparatus that controls an operation such as start and stop of the robot 10. The controller 100 can perform teaching and reproduction of teaching data.

The remote controller 200 is generally called teaching pendant and is an input/output terminal of the controller 100. For example, the remote controller 200 is a portable operation device for teaching. Moreover, the remote controller 200 reproduces teaching data recorded by teaching via the controller 100 and causes the robot 10 to perform a series of operations.

The remote controller 200 is composed of various switches and buttons, and the like and includes an operating unit for performing an operation such as teaching and a display unit that displays teaching data in teaching, a control state of the robot 10, and the like.

Typically, when performing an operation such as gripping and transfer of a work, the robot 10 performs an operation such as gripping and transfer of a work as instructed by the taught teaching data.

However, conventionally, when performing the maintenance operation of a robot, a robot system performs the operation after stopping the robot or turning off the power by a controller. Moreover, in the case of the maintenance operation of, for example, replacing a heavy part such as a motor included in the robot, the operation needs to be performed by using heavy machinery such as a crane. Therefore, it takes time to prepare heavy machinery and perform an actual operation.

In the robot system 1 according to the first embodiment, when performing the maintenance operation of the robot 10, part of the movable units of the robot 10 is caused to operate. In the followings, the state of reproducing teaching data is described as a "play mode" and the state of performing the maintenance operation of the robot 10 is described as a "maintenance mode".

Specifically, in the robot system 1, in the case of the "maintenance mode", only the lift mechanism 22 as one of the movable units is caused to operate and other movable units are stopped. In this embodiment, the movable units may include a joint, and an actuator and a motor as a driving source or include only a driving source.

The robot system 1 can raise and lower the horizontal arm unit 21 of the robot 10 in the vertical direction by an operator operating a handle, a lever, and the like of the remote controller 200.

As a preparation stage of the operation, as shown in FIG. 1, a detachable lifting jig 50 is mounted on the lower surface of the horizontal arm unit 21. In the followings, a case of replacing the speed reducer 14 as a heavy part arranged in the base part 12 is explained.

The robot system 1 raises and lowers the lifting jig 50 by causing the horizontal arm unit 21 to operate in the vertical direction, thereby lifting and transferring the speed reducer 14 arranged in the base part 12. With such an operation, in the robot system 1 according to the first embodiment, heavy machinery such as a crane is not needed, so that the time required for the maintenance operation can be reduced.

Figure 2:
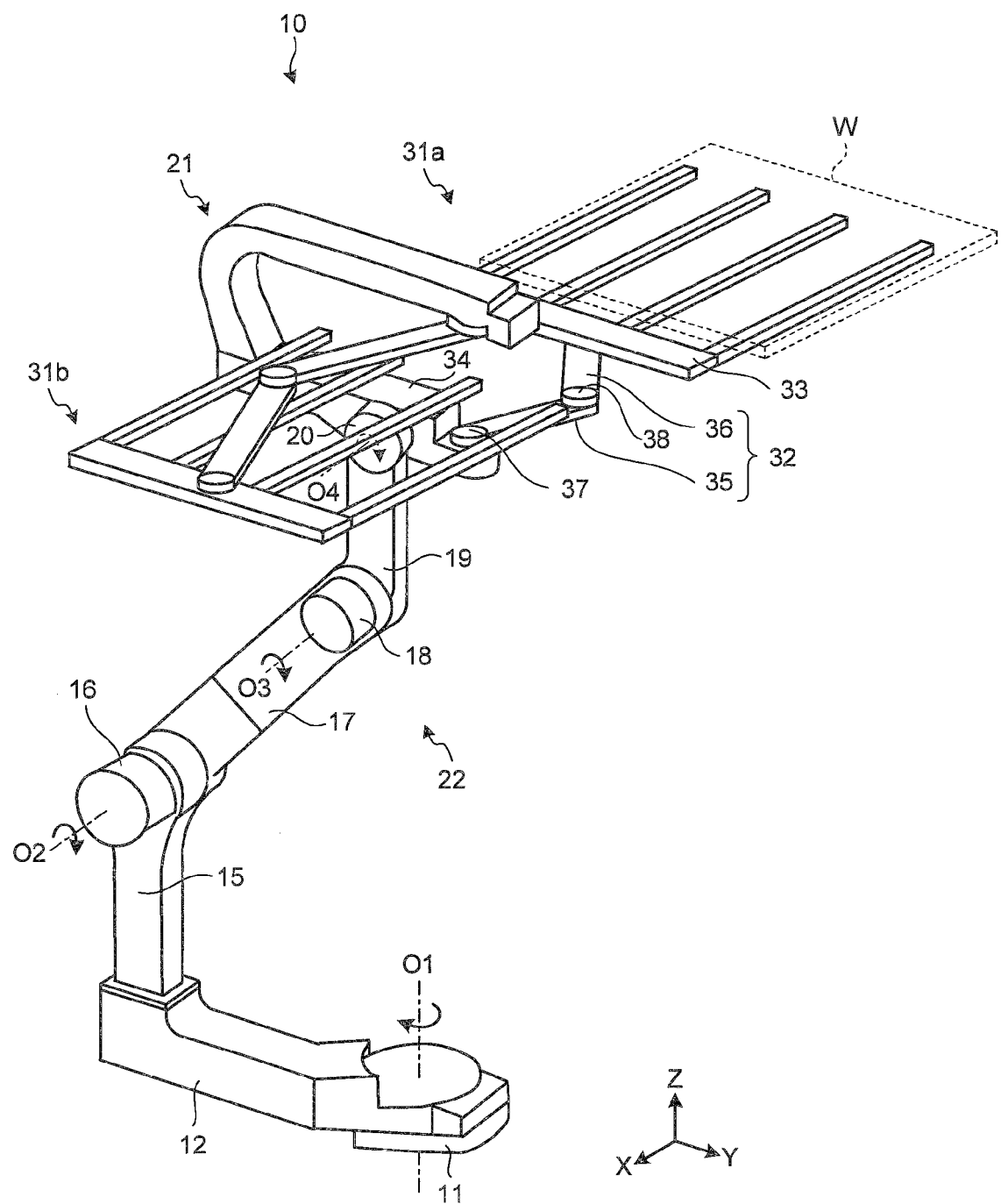
FIG. 2 is a schematic perspective view of a robot according to the first embodiment.

Next, details of the robot 10 according to the first embodiment are explained with reference to FIG. 2. FIG. 2 is a schematic perspective view of the robot 10 according to the first embodiment. In the followings, for convenience' sake of explanation, the positional relationship of each part of the robot 10 is explained under the condition that pivot positions of the robot 10 are in a state shown in FIG. 2. A Z axis direction is the vertical direction.

As shown in FIG. 2, the robot 10 includes the base 11, the base part 12, the lift mechanism 22, and the horizontal arm unit 21, and the lift mechanism 22 includes a supporting column 15, the first joint 16, the second joint 18, the third joint 20, the first link 17, and the second link 19.

The base part 12 includes an approximately disk-shaped pivot portion pivotally attached to the base 11 and an extension portion extending from one end of the pivot portion in a horizontal direction, and pivots around a pivot O1, which is vertical to the base 11, by driving the speed reducer 14. Then, the lift mechanism 22 and the horizontal arm unit 21 revolve around the pivot O1 with the pivoting of the base part 12.

The supporting column 15 is set up in the vertical direction from the tip end of the base part 12. The first link 17 is connected to the tip end of the supporting column 15 at the base end via the first joint 16. Therefore, the first link 17 is supported at the tip end of the supporting column 15 to be rotatable around a joint axis O2 of the first joint 16 that is an axis parallel to the X axis.

The second link 19 is connected to the tip end of the first link 17 at the base end via the second joint 18. Therefore, the second link 19 is supported at the tip end of the first link 17 to be rotatable around a joint axis O3 of the second joint 18 that is an axis parallel to the X axis.

The horizontal arm unit 21 is connected to the tip end of the second link 19 via the third joint 20. Therefore, the horizontal arm unit 21 is supported at the tip end of the second link 19 to be rotatable around a joint axis O4 of the third joint 20 that is an axis parallel to the X axis.

The lift mechanism 22 causes each of the first joint 16, the second joint 18, and the third joint 20 to operate by a not-shown actuator. Consequently, the lift mechanism 22 raises and lowers the horizontal arm unit 21 in the vertical direction (Z axis direction) by changing the attitude of the first link 17 and the second link 19. In this manner, in the robot 10 according to the first embodiment, the horizontal arm unit 21 is supported by one lift mechanism 22.

The horizontal arm unit 21 includes a lower arm unit 31a and an upper arm unit 31b. The lower arm unit 31a and the upper arm unit 31b has a similar configuration, so that only the lower arm unit 31a is explained.

The lower arm unit 31a includes a hand part 33 for placing a work W as an object to be conveyed, an arm part 32 that supports the hand part 33 at the tip end, and a lower support member 34. The lower support member 34 is supported at the tip end of the second link 19 to be rotatable around the joint axis O4 of the third joint 20.

The arm part 32 includes a base end side arm 35 and a tip end side arm 36. The base end side arm 35 is supported by the lower support member 34 to be rotatable around the joint axis of a joint 37. The tip end side arm 36 is supported at the tip end of the base end side arm 35 to be rotatable around the joint axis of a joint 38.

The hand part 33 is rotatably supported at the tip end of the tip end side arm 36. The arm part 32 extends and retracts by a rotation operation of the base end side arm 35 and the tip end side arm 36, whereby the hand part 33 linearly moves in the X axis direction.

Then, in the horizontal arm unit 21, the hand part 33 on which the work W is to be placed is moved in a direction parallel to the joint axis O3 on the pivot O1 side with respect to the supporting column 15. When the pivot positions of the robot 10 are in a state shown in FIG. 2, the X axis direction is a moving direction of the hand part 33 and extension and retraction directions of the arm part 32.

In this embodiment, the horizontal arm unit 21 includes the lower arm unit 31a and the upper arm unit 31b however, for example, the horizontal arm unit 21 may be configured without providing the upper arm unit 31b.

Figure 3A:
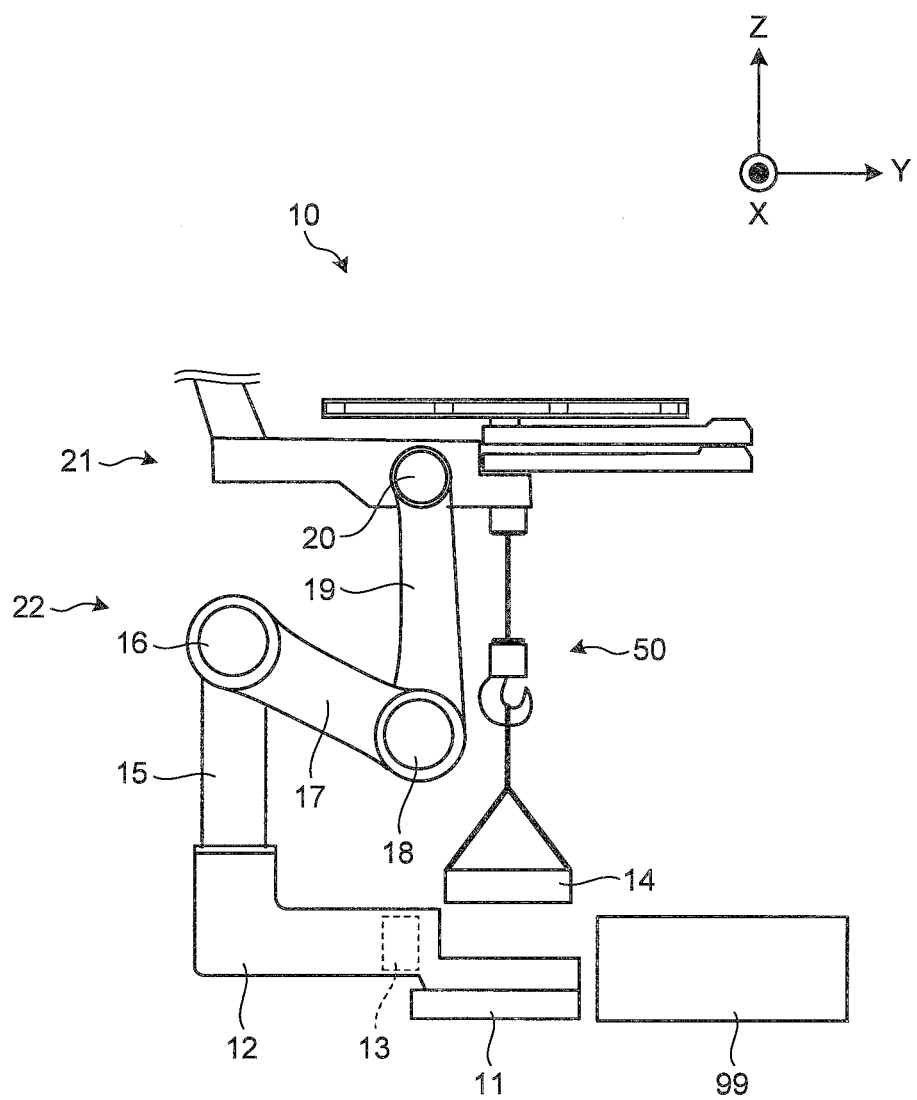
FIG. 3A and FIG. 3B are schematic front views of the robot according to the first embodiment.
Figure 3B:
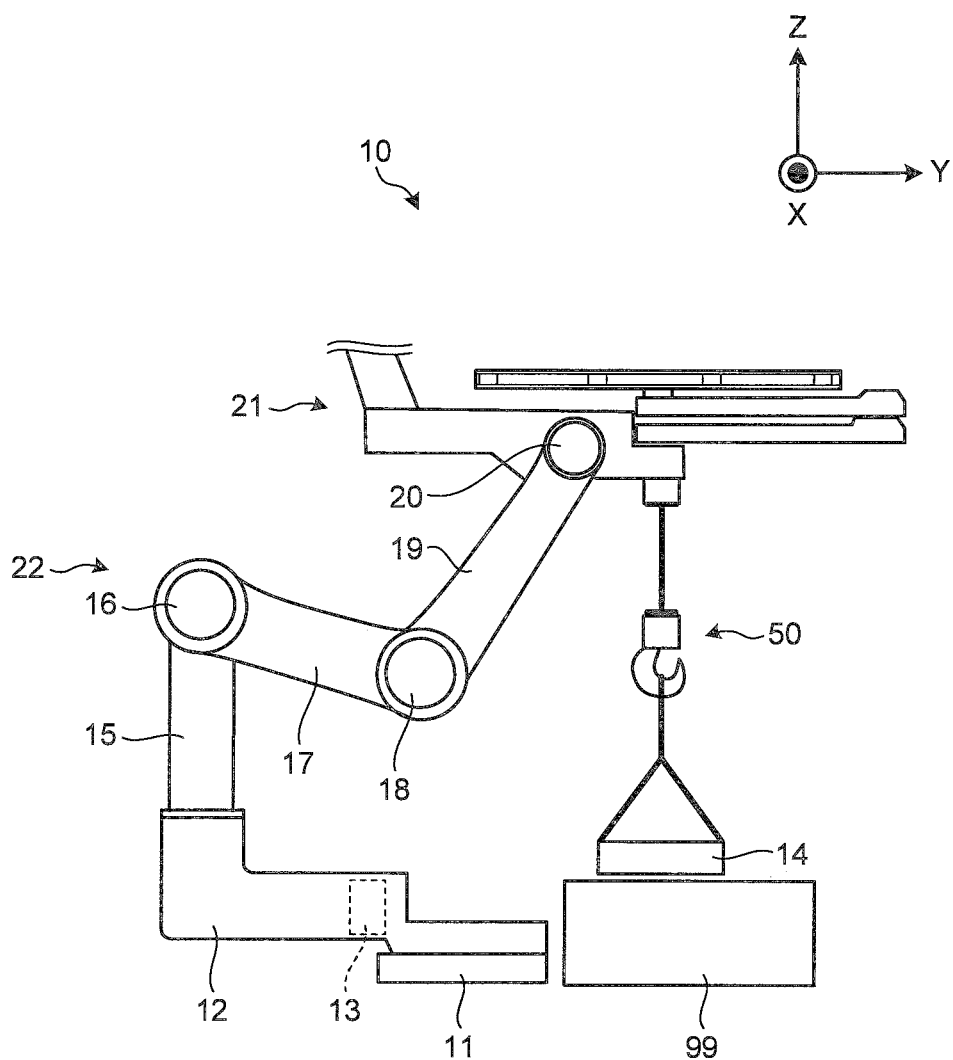

Next, details of the operation of the robot 10 according to the first embodiment are explained with reference to FIG. 3A and FIG. 3B. FIG. 3A is a first schematic front view of the robot 10 according to the first embodiment and FIG. 3B is a second schematic front view of the robot 10 according to the first embodiment. In the followings, explanation is given by appropriately using the coordinate axes as shown in the upper right in FIG. 3A and FIG. 3B.

In FIG. 3A and FIG. 3B, the upper arm unit 31b in the horizontal arm unit 21 has a configuration similar to the lower arm unit 31a, so that the upper arm unit 31b is omitted in FIG. 3A and FIG. 3B. Moreover, the lifting jig 50 is mounted on the lower side of the horizontal arm unit 21 and the speed reducer 14 arranged in the base part 12 is lifted by the lifting jig 50.

As shown in FIG. 3A, the robot 10 includes the base 11, the base part 12, a pivoting motor 13, the speed reducer 14, the lift mechanism 22, and the horizontal arm unit 21, and the lift mechanism 22 includes the supporting column 15, the first joint 16, the second joint 18, the third joint 20, the first link 17, and the second link 19. Moreover, a work station 99 for performing a replacing operation of the speed reducer 14 is arranged on the positive direction side of the Y axis of the base 11.

The pivoting motor 13 is a driving source of the pivot mechanism arranged in the base part 12, and the driving force of the pivoting motor 13 is transmitted to the speed reducer 14 via a not-shown belt. The output shaft of the speed reducer 14 is fixed to the base 11 and the base part 12 pivots around a pivot parallel to the Z axis by driving the speed reducer 14.

In the maintenance operation of the robot 10, for example, when replacing the speed reducer 14, the robot system 1 causes only the lift mechanism 22 as one of the movable units to operate and keeps other movable units including the pivoting motor 13 and the like stopped.

Specifically, in the case of the "maintenance mode", the robot system 1 rotates the first link 17 and the second link 19 by driving an actuator and a motor (not shown) built in the first joint 16 and the second joint 18. Consequently, the horizontal arm unit 21 is raised and lowered along the pivot O1.

In the robot system 1, the lifting jig 50 is detachable from the lower surface of the horizontal arm unit 21 on the extension of the pivot O1. Because the pivot O1 and the third joint 20 are located at positions that do not intersect each other, the first link 17 and the second link 19 do not obstruct the lifting jig 50 and the rope of the lifting jig 50.

In the robot system 1, the lifting jig 50 is raised by a normal operation, that is, a lift control same as the operation when performing gripping and transfer of a work, whereby the detachable speed reducer 14 can be lifted in the vertical direction.

In the robot system 1, in the case of the "maintenance mode", the horizontal arm unit 21 of the robot 10 is raised and lowered in the vertical direction by an operator operating a handle, a lever, and the like included in the remote controller 200.

From this state, the robot system 1 further causes the lift mechanism 22 to operate to move the horizontal arm unit 21 in the positive direction of the Y axis as shown in FIG. 3B, thereby transferring the speed reducer 14 to the work station 99 for performing a replacing operation of the speed reducer 14.

In this embodiment, the horizontal arm unit 21 is moved in the vertical direction and the positive direction of the Y axis by causing the lift mechanism 22 to operate, however, it is not limited thereto. For example, a slide mechanism, which linearly moves in the Y axis direction or the X axis direction, may be provided in the upper portion of the lifting jig 50.

Consequently, the robot system 1 can raise and lower the horizontal arm unit 21 in the vertical direction by the lift mechanism 22 and moreover, move the lifting jig 50 in the horizontal direction by the slide mechanism included in the lifting jig 50.

Moreover, the lifting jig 50 may be mounted on the hand part 33 for placing the work W, and with this configuration, the robot system 1 can move the lifting jig 50 in the vertical direction and a direction parallel to the joint axis O3 with respect to the supporting column 15.

As above, in the first embodiment, in the case of the "maintenance mode", the robot system transfers a heavy part by causing only part of the movable units included in the robot to operate. Consequently, the robot system according to the first embodiment does not need heavy machinery such as a crane and thus can reduce the time required for the maintenance operation.

In the above-described robot system according to the first embodiment, the lift mechanism included in the robot includes a plurality of joints and links. However, a lift mechanism composed of different members may be used.

In a second embodiment described below, explanation is given for a robot that includes a lift mechanism composed of members different from the robot system according to the first embodiment.

(Second Embodiment)

Figure 4A:
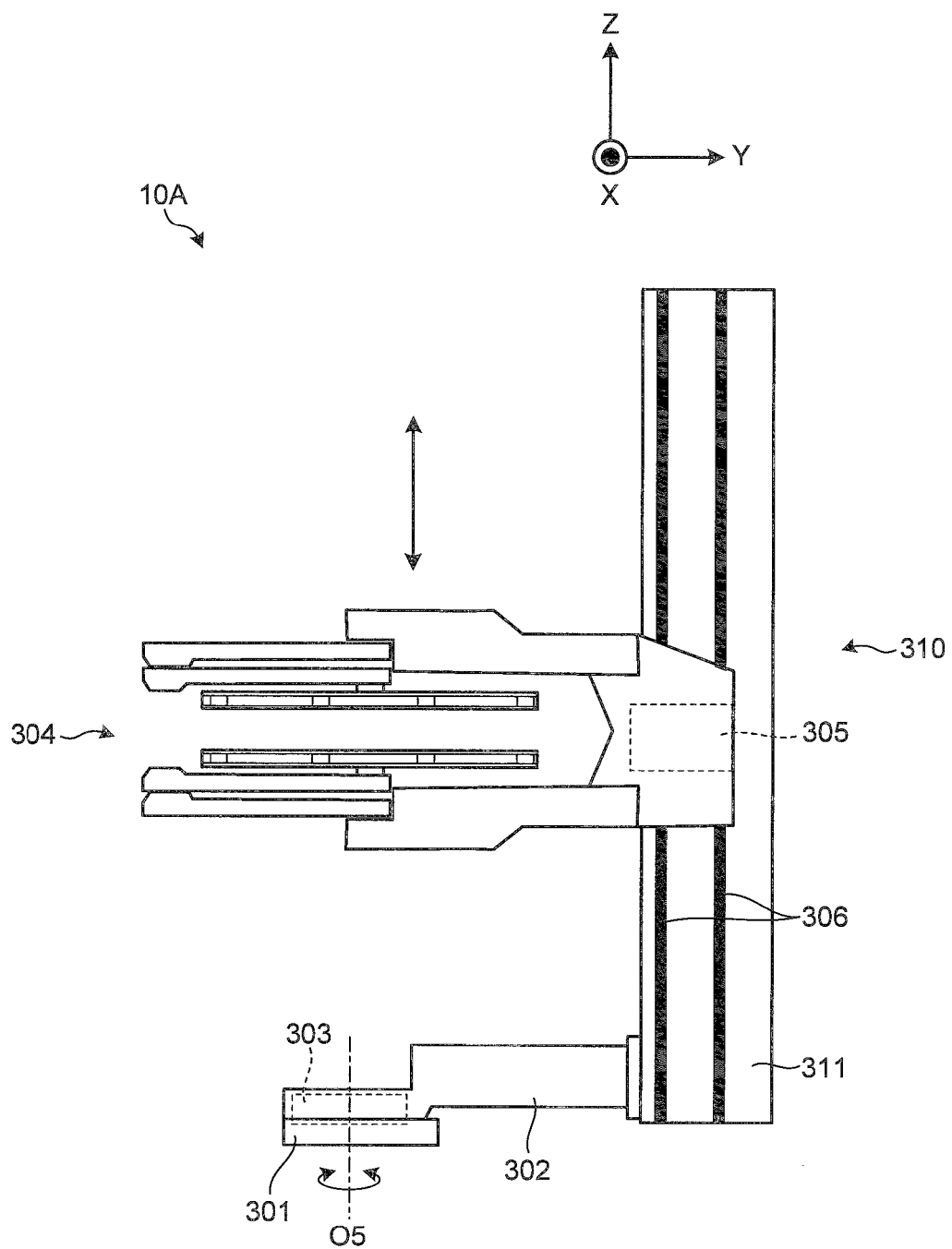
FIG. 4A, FIG. 4B, and FIG. 4C are schematic front views of a robot according to a second embodiment.
Figure 4B:
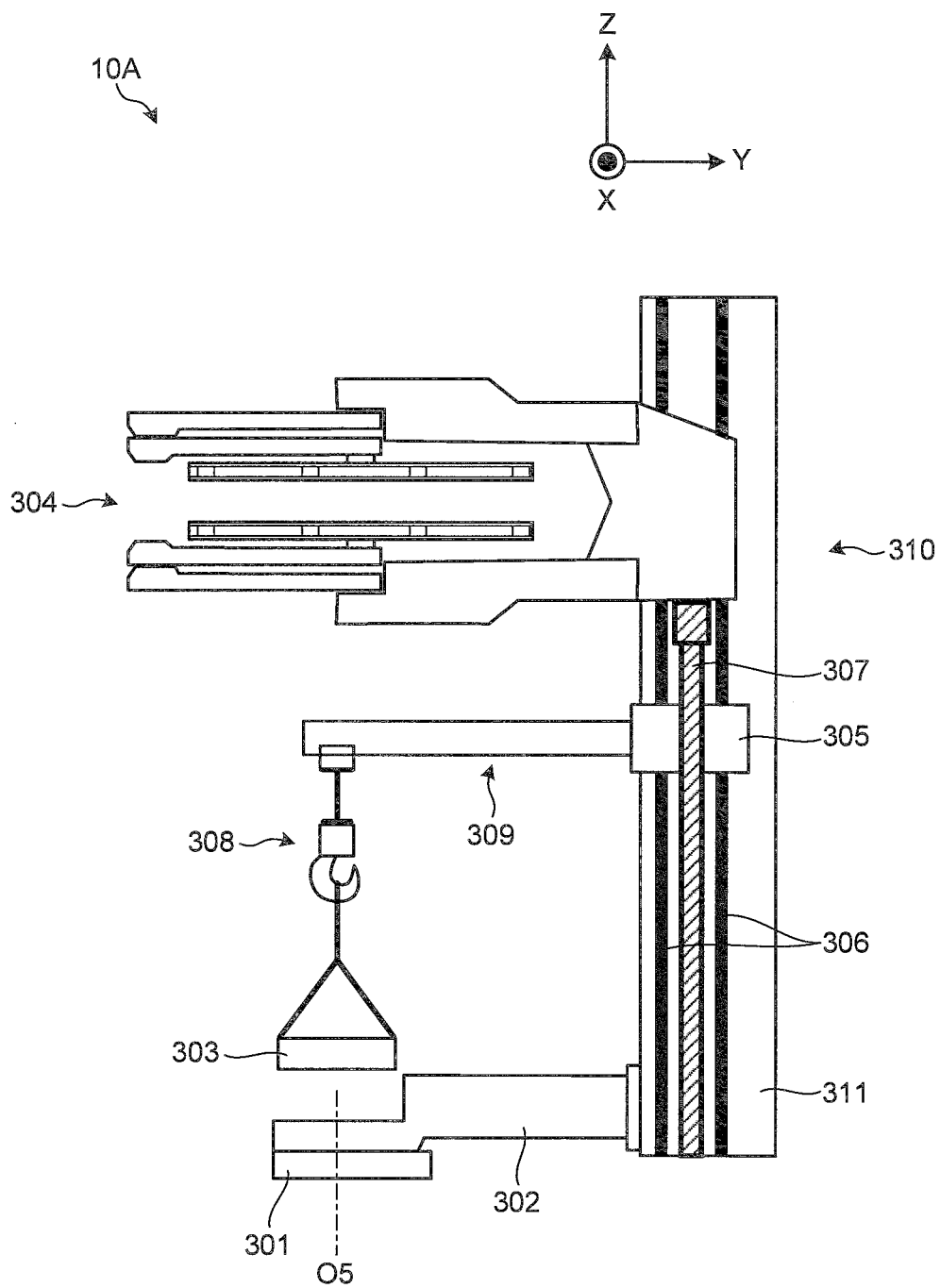
Figure 4C:
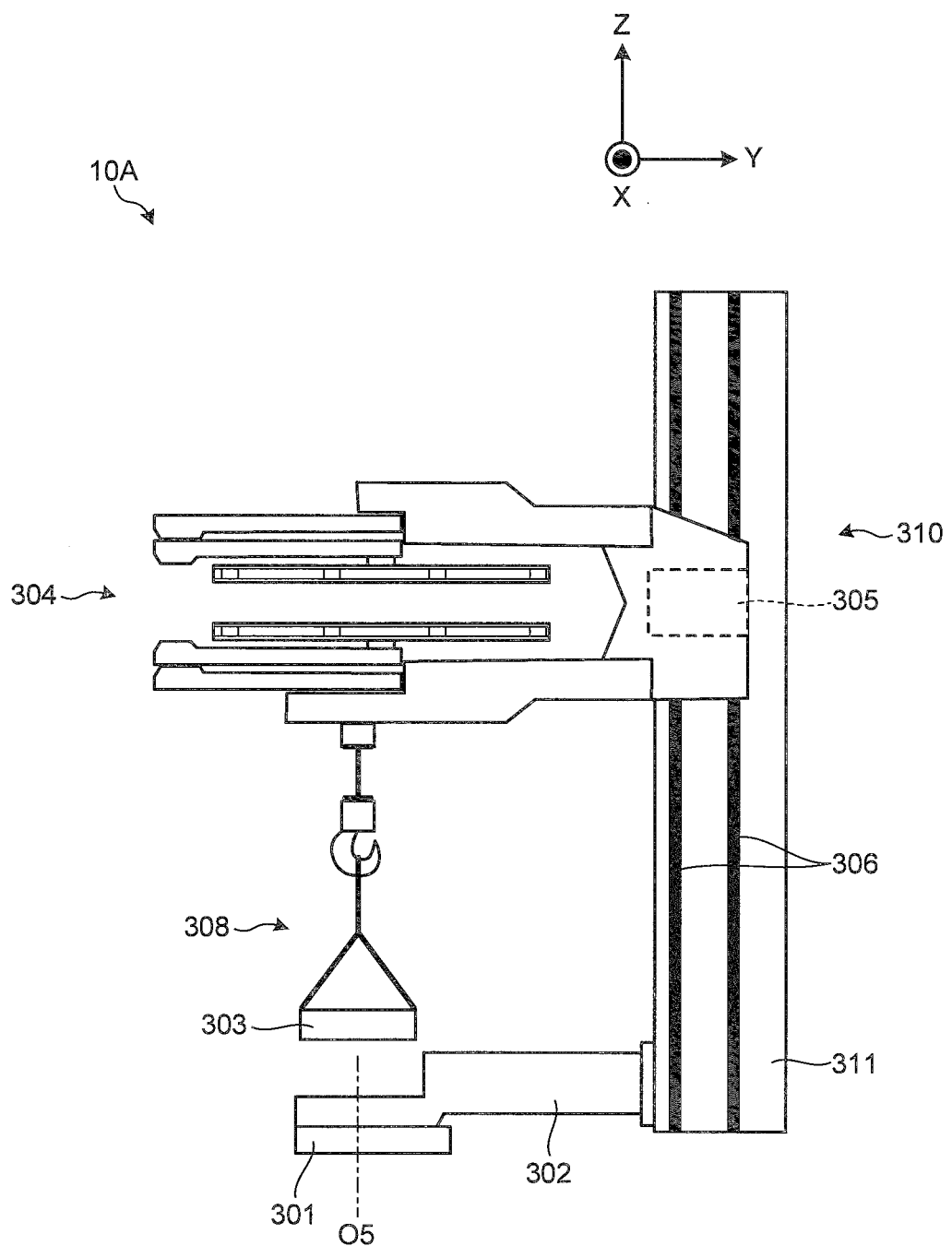

FIG. 4A to FIG. 4C are first to third schematic front views of a robot 10A according to the second embodiment. A lift mechanism 310 included in the robot 10A according to the second embodiment travels in the vertical direction while being guided by a guide rail, which is different from the first embodiment.

The configuration of a horizontal arm unit 304 is similar to FIG. 2, so that explanation of the configuration thereof is omitted here.

First, as shown in FIG. 4A, the robot 10A includes a base 301, a base part 302, a speed reducer 303, the lift mechanism 310, and the horizontal arm unit 304, and the lift mechanism 310 includes a supporting column 311, a vertical driving unit 305, and a rail part 306.

The base part 302 includes an approximately disk-shaped pivot portion pivotally attached to the base 301 and an extension portion extending from one end of the pivot portion in the horizontal direction. The extension portion side of the base part 302 is fixed to the lower portion of the supporting column 311.

The speed reducer 303 is arranged in the base 301 or the pivot portion side in the base part 302, and the base part 302 pivots around a pivot O5 vertical to the base 301 by the speed reducer 303. The supporting column 311 revolves around the pivot O5 with the pivoting of the base part 302, however, the supporting column 311 revolves at a position distance from the center by the length of the base part 302.

In the lift mechanism 310, the vertical driving unit 305 slides in the vertical direction (Z axis direction) along the rail part 306 arranged parallel to the supporting column 311 by causing the vertical driving unit 305 to operate by a not-shown actuator.

With this movement, the horizontal arm unit 304 connected to the vertical driving unit 305 is raised and lowered in the vertical direction along the supporting column 311 above the base 301. The vertical driving unit 305 and the horizontal arm unit 304 are detachable.

In the followings, explanation is given for a case of replacing a heavy part such as a motor included in the robot 10A having the above configuration with reference to FIG. 4B. In this embodiment, a case of replacing the speed reducer 303 is explained.

As shown in FIG. 4B, in the robot system according to the second embodiment, in the case of the "maintenance mode", first, in a state where connection between the horizontal arm unit 304 and the vertical driving unit 305 is released, the horizontal arm unit 304 is jacked up.

Then, in the robot system, the horizontal arm unit 304 is fixed by a fall preventing jig 307, and a lifting jig 308 is mounted on the vertical driving unit 305 included in the lift mechanism 310.

Specifically, in the robot system, a jig arm 309 prepared in advance for maintenance is connected to the vertical driving unit 305 and moreover, the lifting jig 308 is mounted on the jig arm 309 in a state where the hook of the lifting jig 308 is located on the extension of the pivot O5. The jig arm 309 can extend and retract in the horizontal direction (Y axis direction).

Next, in the robot system, an actuator and a motor (not shown) built in the vertical driving unit 305 are driven. Consequently, the vertical driving unit 305 raises the lifting jig 308 to lift the detachable speed reducer 303 in the vertical direction.

Moreover, the robot system transfers the speed reducer 303 by extending and retracting the jig arm 309 in the Y axis direction. In this manner, in robot system, the operation is performed while reducing a loaded on the motor built in the vertical driving unit 305 by temporarily separating the horizontal arm unit 304.

In this embodiment, the jig arm 309 and the speed reducer 303 are composed of members with which the total weight of the jig arm 309 and the speed reducer 303 becomes lighter than the horizontal arm unit 304. Therefore, it is sufficient that the motor built in the vertical driving unit 305 has a capacity enough to move the horizontal arm unit 304 and a load when lifting the speed reducer 303 does not need to be considered.

The jig arm 309 is separated from the robot and is configured to be connected to the vertical driving unit 305 in the case of the "maintenance mode". However, it is not limited thereto and, for example, the configuration may be such that the horizontal arm unit 304 excluding the arm is separated in a state where the arm included in the horizontal arm unit 304 is connected to the vertical driving unit 305.

Moreover, in the robot system shown in FIG. 4B, the horizontal arm unit 304 is temporarily separated and the jig arm 309 and the lifting jig 308 are mounted, however, it is not limited thereto.

For example, as shown in FIG. 4C, the detachable lifting jig 308 may be directly mounted on the horizontal arm unit 304 in a state where the horizontal arm unit 304 is connected to the vertical driving unit 305.

In this case, the lifting jig 308 is mounted on the horizontal arm unit 304 in a state where the hook of the lifting jig 308 is located on the extension of the pivot O5. Then, the vertical driving unit 305 raises the lifting jig 308 to lift the detachable speed reducer 303 in the vertical direction.

As described above, in the second embodiment, in the case of the "maintenance mode", the robot system transfers a heavy part by activating only part of the movable units included in the robot. Moreover, it is possible to operate by attaching an arm, on which the lifting jig is directly mounted, to the lift mechanism so that the lifting jig is movable in the horizontal direction (Y axis direction). With this configuration, in the robot system according to the second embodiment, heavy machinery such as a crane is not needed, so that the time required for the maintenance operation can be reduced.

(Third Embodiment)

Next, a robot 10B according to the third embodiment is explained with reference to FIG. 5A to FIG. 5D. The robot 10B according to the third embodiment includes a travel mechanism 39, which is different from the robots 10 and 10A in the first and second embodiments.

Figure 5A:
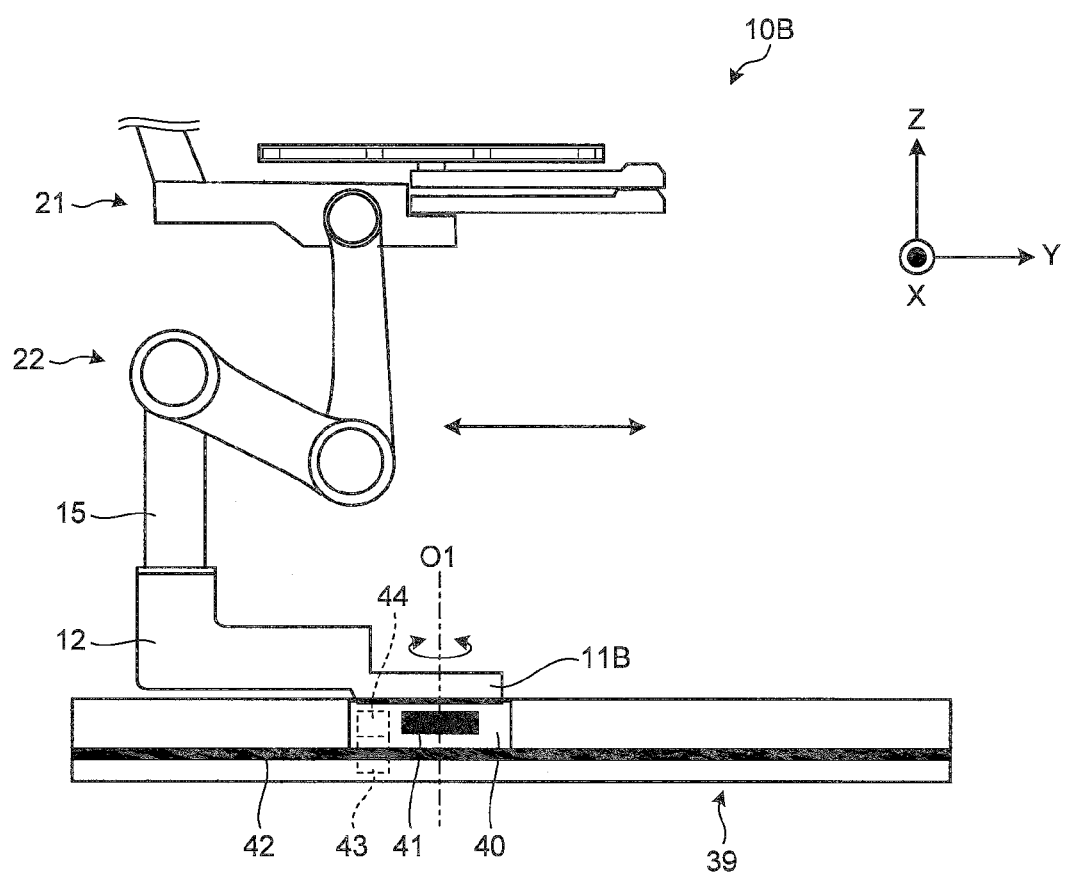
FIG. 5A, FIG. 5B, FIG. 5C, and FIG. 5D are schematic front views of a robot according to a third embodiment.

FIG. 5A to FIG. 5D are first to fourth schematic front views of the robot 10B according to the third embodiment. First, as shown in FIG. 5A, the robot 10B according to the third embodiment includes the travel mechanism 39. The robot 10B has a configuration similar to the robot 10 in the first embodiment except for the configuration of a base 11B, so that, in this embodiment, only the different configuration is explained.

The base 11B and the base part 12 pivot around the pivot O1 vertical to the base 11B by driving the driving source of a not-shown pivot mechanism. Then, with the pivoting of the base part 12, the lift mechanism 22 and the horizontal arm unit 21 revolve around the pivot O1.

The travel mechanism 39 is provided with a rack gear 42 extending along the Y axis direction. On the other hand, a travelling unit 40 is connected to the lower portion of the base 11B and the base 11B and the travelling unit 40 are detachable.

In the travelling unit 40, a travelling motor 44 and a CRB (cross roller bearing) 41 are incorporated and a pinion gear 43 is provided. The pinion gear 43 meshes with the rack gear 42 of the travel mechanism 39 and rotates by the travelling motor 44. The CRB 41 rotates around the pivot O1 with the pivoting of the base 11B and the base part 12.

Therefore, the pinion gear 43 rotates by driving the travelling motor 44, and a portion above the base 11B moves together with the travelling unit 40 with the Y axis direction, which is the extending direction of the rack gear 42, as a travel axis. Moreover, a not-shown linear guide is arranged, and the portion above the base 11B is driven by the above rack and pinion and travels while being guided by the linear guide.

In this embodiment, a structure in which the rack and pinion is used as the travel mechanism 39 is explained as an example, however, the travel mechanism 39 is not limited thereto. For example, the travel mechanism 39 may perform the traveling movement by a pulley and a belt instead of the rack and pinion.

Figure 5B:
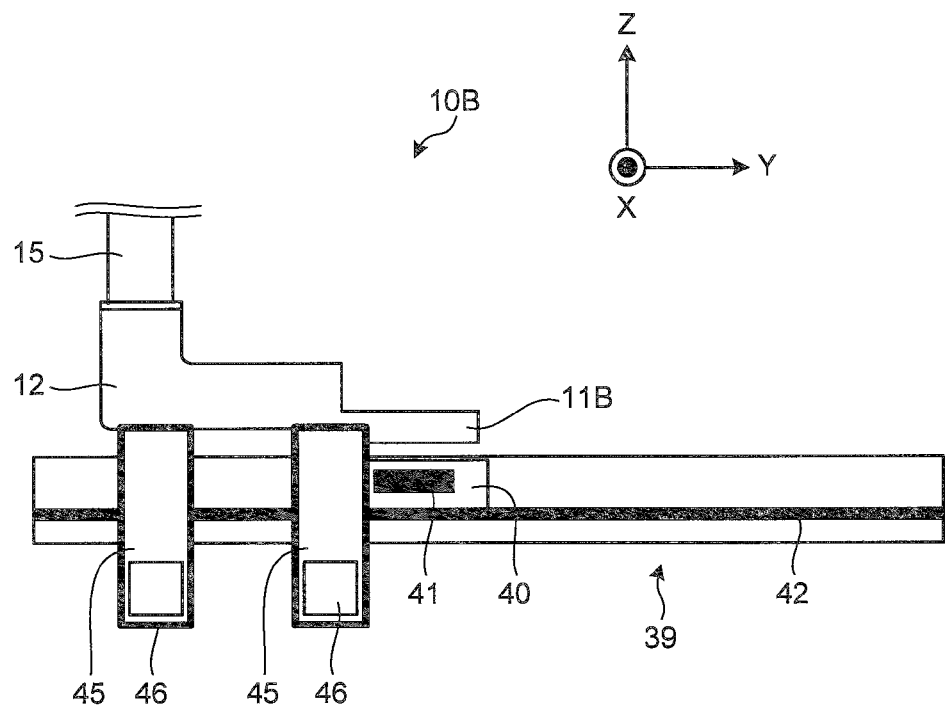
Figure 5C:
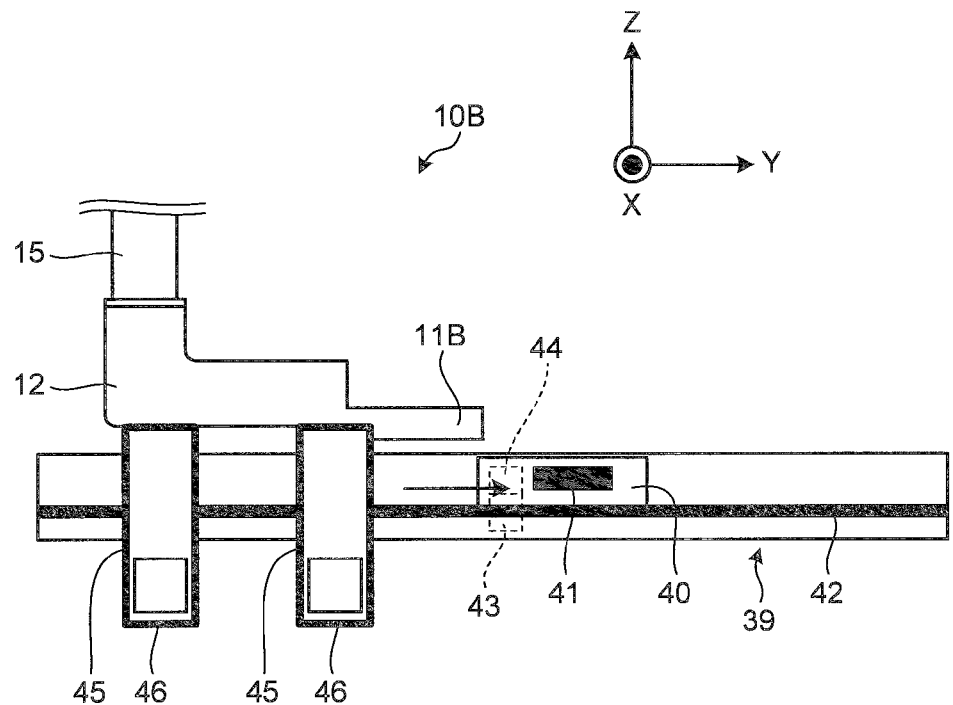

In the followings, explanation is given for a case of performing the maintenance operation of the CRB 41 included in the robot 10B having the above configuration with reference to FIG. 5B and FIG. 5C. As shown in FIG. 5B, in the robot system according to the third embodiment, in the case of the "maintenance mode", first, the base 11B and the base part 12 are jacked up by jacks 45 in a state where connection between the base 11B and the travelling unit 40 is released.

At this time, the jacks 45 jack up the base 11B and the base part 12 by causing drive mechanisms 46 arranged in the jacks 45 to operate. Specifically, the drive mechanism 46 may be a hydraulic type or may be a screw jack driven by a motor.

Then, as shown in FIG. 5C, in the robot system, in a state where the base 11B and the base part 12 are jacked up by the jacks 45, only the travelling motor 44 is driven. Because connection between the base 11B and the travelling unit 40 is released, only the travelling unit 40 travels in the positive direction of the Y axis.

Consequently, the upper surface of the travelling unit 40 is exposed, and in the robot system, an operator can perform the maintenance operation of the CRB 41 arranged in the upper portion of the travelling unit 40.

The driving source of the drive mechanism 46 arranged in the jack 45 may be arranged in a different driving source that is stopped, and an actuator, which is not a hydraulic type, may be removed and used. In this manner, with the use of a driving source, which is not a hydraulic type, there is no risk of adhesion of oil of a hydraulic jack to the robot 10B, enabling to maintain performance of the robot 10B.

Moreover, in the robot system shown in FIG. 5A to FIG. 5C, in the case of the "maintenance mode", the base 11B and the base part 12 are jacked up by the jacks 45 in a state where connection between the base 11B and the travelling unit 40 is released.

However, it is not limited thereto. For example, as shown in FIG. 5D, in a state where the second joint 18 is placed on a stand 47, the base 11B and the base part 12 may be raised by rotating the first link 17.

Figure 5D:
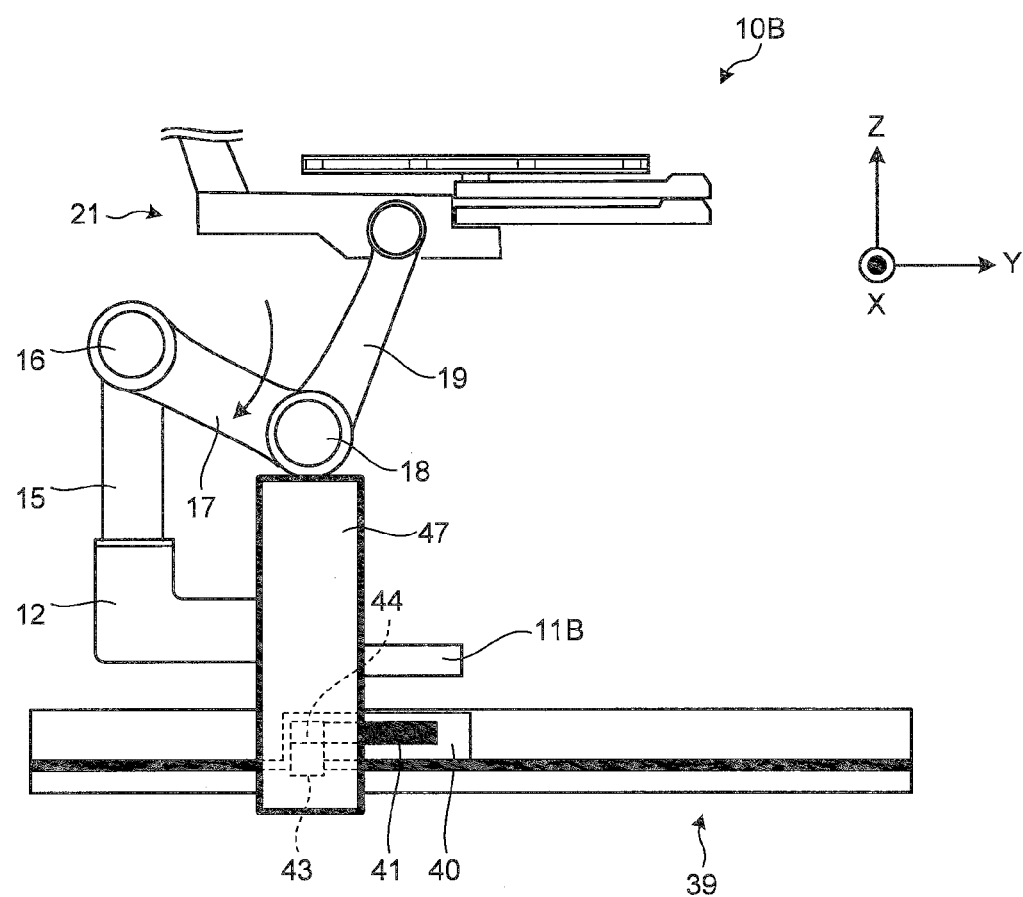

Specifically, in the case of the "maintenance mode", the robot system releases connection between the base 11B and the travelling unit 40, and as shown in FIG. 5D, the stand 47 prepared for maintenance is arranged.

In the robot system, the first link 17 and the second link 19 are rotated to place the second joint 18 on the stand 47, and moreover, the first link 17 is rotated to raise the base 11B and the base part 12.

Then, in the robot system, in a state where the base 11B and the base part 12 are raised, the travelling unit 40 is moved in the positive direction of the Y axis by driving only the travelling motor 44. Consequently, the upper surface of the travelling unit 40 is exposed, and in the robot system, an operator can perform the maintenance operation of the CRB 41 arranged in the upper portion of the travelling unit 40.

As described above, in the third embodiment, in the case of the "maintenance mode", the robot system releases connection between the base and the travelling unit, and, in a state where the portion above the base is raised, moves only the travelling unit. Consequently, in the robot system according to the third embodiment, working space for the maintenance operation can be ensured and the time required for the maintenance operation can be reduced.

(Fourth Embodiment))

Figure 6A:
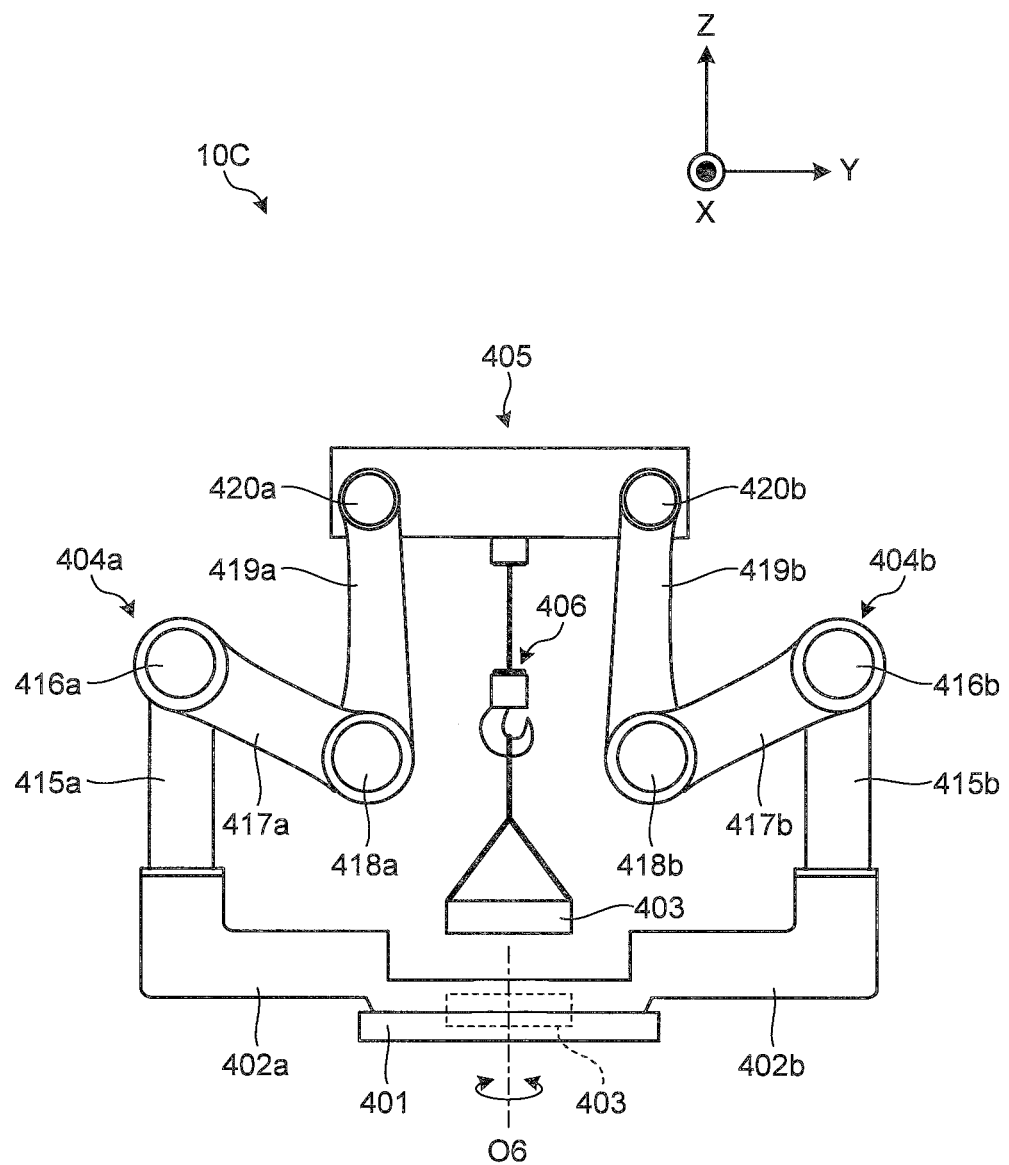
FIG. 6A and FIG. 6B are schematic front views of a robot according to a fourth embodiment.
Figure 6B:
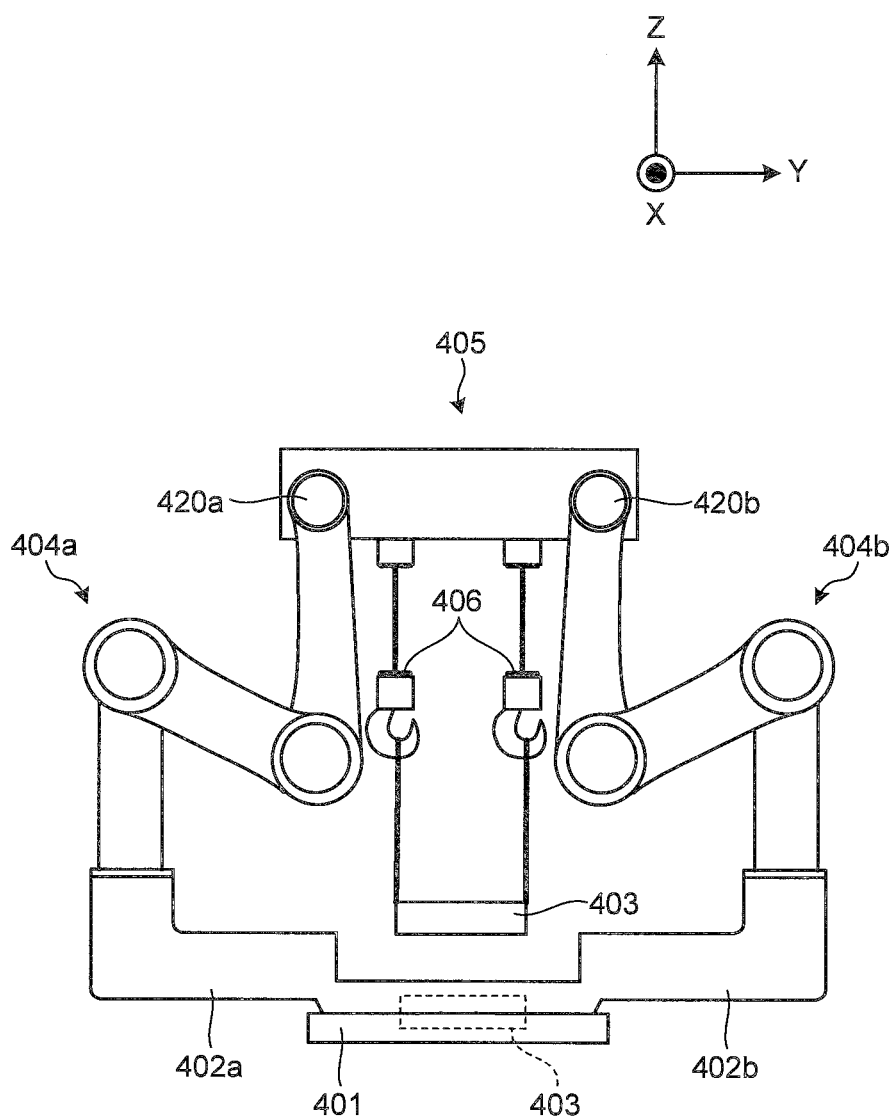

Next, a robot 10C according to the fourth embodiment is explained with reference to FIG. 6A and FIG. 6B. FIG. 6A and FIG. 6B are first and second schematic front views of the robot 100 according to the fourth embodiment.

The robot 100 according to the fourth embodiment includes two leg units, which is different from the robot 10 of the first embodiment. The leg units are parts that include base parts 402a and 402b and lift mechanisms 404a and 404b, respectively, and support a horizontal arm unit 405.

As shown in FIG. 6A, the robot 10C according to the fourth embodiment includes a base 401, the base parts 402a and 402b, the lift mechanisms 404a and 404b, and the horizontal arm unit 405.

Moreover, the base 401 includes a detachable speed reducer 403. The lift mechanism 404a and the lift mechanism 404b are arranged to oppose each other with the base 401 therebetween. The lift mechanism 404a includes a supporting column 415a, a first joint 416a, a second joint 418a, a third joint 420a, a first link 417a, and a second link 419a. The lift mechanism 404b includes a supporting column 415b, a first joint 416b, a second joint 418b, a third joint 420b, a first link 417b, and a second link 419b.

Each of the lift mechanisms 404a and 404b has a configuration similar to the lift mechanism 22 of the robot 10 in the first embodiment, so that explanation of the configuration of each of the lift mechanisms 404a and 404b is omitted here.

The lift mechanisms 404a and 404b raise and lower the horizontal arm unit 405 in the vertical direction (Z axis direction) by causing the first joints 416a and 416b, the second joints 418a and 418b, and the third joints 420a and 420b to operate, respectively, by a not-shown actuator.

Moreover, two lift mechanisms 404a and 404b supporting the horizontal arm unit 405 are arranged to be opposed to each other with the base 401 therebetween, so that the horizontal arm unit 405 can move not only in the vertical direction but also in the horizontal direction (Y axis direction).

The horizontal arm unit 405 has a configuration similar to the horizontal arm unit 21 of the robot 10 in the first embodiment, so that explanation of the configuration of the horizontal arm unit 405 is omitted here.

The base parts 402a and 402b pivot around the pivot O6 vertical to the base 401. Then, with the pivoting of the base parts 402a and 402b, the lift mechanisms 404a and 404b and the horizontal arm unit 405 pivot around the pivot O6.

In the robot system according to the fourth embodiment also, in the similar manner to the robot system 1 in the first embodiment, in the case of the "maintenance mode", only the lift mechanisms 404a and 404b as one of the movable units are caused to operate and other movable units are stopped.

A lifting jig 406 is mounted on the lower surface of the horizontal arm unit 405 in a state where the hook of the lifting jig 406 is located on the extension of the pivot O6.

Then, in the robot system, after the detachable speed reducer 403 is lifted in the vertical direction by the lifting jig 406 mounted on the lower surface of the horizontal arm unit 405, the speed reducer 403 is moved in the horizontal direction.

In the robot system shown in FIG. 6A, one lifting jig 406 is mounted on the lower surface of the horizontal arm unit 405. However, it is not limited thereto, and, for example as shown in FIG. 6B, the lifting jig 406 may be mounted on the horizontal arm unit 405 on each of the lift mechanism 404a side and the lift mechanism 404b side.

In the robot system shown in FIG. 6B, the speed reducer 403 may be lifted in the vertical direction by two lifting jigs 406.

In the robot 100 according to the fourth embodiment, the lift mechanisms 404a and 404b are arranged on the right and left sides to oppose each other with the pivot O6 therebetween and the horizontal arm unit 405 is supported by the two lift mechanisms 404a and 404b.

Therefore, the horizontal arm unit 405 rotates around the horizontal axis (X axis direction). Specifically, when the attitude is changed by the two lift mechanisms 404a and 404b so that the height of the third joint 420a and the third joint 420b becomes different, the horizontal arm unit 405 pivots around the horizontal axis (X axis direction).

Consequently, in the robot 10C according to the fourth embodiment, a member such as the speed reducer 403, which needs to be inserted and removed into and from a member with a high accuracy, can be smoothly attached and detached without being damaged.

As described above, in the fourth embodiment, the robot system can reduce the time required for the maintenance operation by causing only part of the movable units included in the robot to operate in the case of the "maintenance mode".

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A robot system comprising:
   a robot that includes a plurality of movable units that operate in predetermined directions, the robot comprising, as the movable units,
      a horizontal arm unit that includes a hand part that holds an object to be carried,
      a lift mechanism that raises and lowers the horizontal arm unit, and
      a pivot mechanism that causes the lift mechanism to pivot with respect to a base;
   a control unit that controls operations of the movable units of the robot; and
   a jig that is provided between a predetermined member, which is detachably provided on the pivot mechanism, and the horizontal arm unit,
   wherein the control unit makes the predetermined member be movable from the pivot mechanism by causing the lift mechanism to operate in a state where at least the pivot mechanism is stopped and raising and lowering the horizontal arm unit in a vertical direction.

2. The robot system according to claim 1, wherein the lift mechanism includes
   a base part that is connected to the base at a base end side to be rotatable around a vertical axis,
   a first link that is connected to a tip end side of the base part at a base end side to be rotatable around a horizontal axis of a first joint,
   a second link that is connected to a tip end of the first link at a base end side to be rotatable around a horizontal axis of a second joint and is connected to the horizontal arm unit at a tip end side via a horizontal axis of a third joint, and
   a driving source that rotates each of the horizontal axes.

3. The robot system according to claim 1, wherein the lift mechanism includes
   a base part that is connected to the base at a base end side to be rotatable around a vertical axis,
   a supporting column that includes a rail part and is set up on a tip end side of the base part,
   a vertical lifting unit which is movable along the rail part and to which the horizontal arm unit is connected, and
   a driving source that raises and lowers the vertical lifting unit.

4. The robot system according to claim 1, wherein the lift mechanism connects tip ends, which extend from base parts connected with each other, to the horizontal arm unit with a predetermined interval therebetween, and is capable of raising and lowering the horizontal arm unit, and.

5. The robot system according to claim 4, wherein the lift mechanism includes
   a pair of link mechanisms extending from the base parts, and
   a driving source that separately drives the link mechanisms,
   the jig includes a first lifting jig and a second lifting jig that are locked to the predetermined member at lower ends with a predetermined interval therebetween and are connected to the horizontal arm unit at upper ends.

6. A robot system comprising:
   a robot that includes a plurality of movable units that operate in predetermined directions, the robot comprising, as the movable units,
      a horizontal arm unit that includes a hand part that holds an object to be carried,
      a lift mechanism that raises and lowers the horizontal arm unit, and
      a pivot mechanism that causes the lift mechanism to pivot with respect to a base,
   the lift mechanism includes
      a base part that is connected to the base at a base end side to be rotatable around a vertical axis,
      a supporting column that includes a rail part and is set up on a tip end side of the base part,
      a vertical lifting unit which is movable along the rail part and to which the horizontal arm unit is detachably connected, and
      a driving source that raises and lowers the vertical lifting unit;
   a control unit that controls operations of the movable units of the robot; and
   a jig arm that is connected to the vertical lifting unit instead of the horizontal arm unit and a jig that is provided between a predetermined member detachably provided on the pivot mechanism and the jig arm,
   wherein the control unit makes the predetermined member movable from the pivot mechanism by causing the lift mechanism to operate in a state where the pivot mechanism is stopped and raising and lowering the jig arm in a vertical direction.

7. A robot system comprising:
   a robot that includes a plurality of movable units that operate in predetermined directions, the robot comprising, as the movable units,
      a horizontal arm unit that includes a hand part that holds an object to be carried,
      a lift mechanism that raises and lowers the horizontal arm unit,
      a travel mechanism that horizontally moves the lift mechanism via a traveling unit, and
      a pivot mechanism that causes the lift mechanism to pivot in a horizontal direction with respect to the travel mechanism; and
   a control unit that controls operations of the movable units of the robot,
   wherein the traveling unit further includes a travel driving unit that is provided with the pivot mechanism and is attachable and detachable to and from the lift mechanism to drive the traveling unit, and
   the control unit makes a detachable member mounted on the pivot mechanism be capable of being transferred by causing the travel driving unit to operate in a state where at least the pivot mechanism is stopped and moving the traveling unit in a horizontal direction under a condition where the traveling unit is released from the lift mechanism.

* * * * *